United States Patent [19]

Faulkner

[11] Patent Number: 4,483,137
[45] Date of Patent: Nov. 20, 1984

[54] GAS TURBINE ENGINE CONSTRUCTION AND OPERATION

[75] Inventor: Robie L. Faulkner, Santee, Calif.

[73] Assignee: Solar Turbines, Incorporated, San Diego, Calif.

[21] Appl. No.: 288,510

[22] Filed: Jul. 30, 1981

[51] Int. Cl.³ .............................................. F02C 7/00
[52] U.S. Cl. ..................................... 60/39.55; 60/748
[58] Field of Search ............... 60/39.05, 39.094, 39.55, 60/39.58, 39.59, 739, 748

[56] References Cited

U.S. PATENT DOCUMENTS

| | | | |
|---|---|---|---|
| 3,774,851 | 11/1973 | Simmons | 239/551 |
| 3,826,080 | 7/1974 | De Carso et al. | 60/39.55 |
| 3,980,233 | 9/1976 | Simmons et al. | 60/748 |
| 4,222,243 | 9/1980 | Mobsby | 60/748 |
| 4,327,547 | 5/1982 | Hughes et al. | 60/39.55 |
| 4,337,618 | 7/1982 | Hughes et al. | 60/39.55 |

FOREIGN PATENT DOCUMENTS

| | | |
|---|---|---|
| 2003552 | 3/1979 | United Kingdom . |
| 2055186 | 2/1981 | United Kingdom . |

*Primary Examiner*—Louis J. Casaregola
*Attorney, Agent, or Firm*—LeBlanc, Nolan, Shur & Nies

[57] ABSTRACT

Gas turbine engines in which provision is made for introducing a liquid coolant into the combustor of the engine. This reduces the flame temperature in the combustor, thereby discouraging the formation of thermal $NO_x$.

15 Claims, 9 Drawing Figures

GAS TURBINE ENGINE CONSTRUCTION AND OPERATION

The present invention relates to gas turbine engines and, more specifically, to novel, improved gas turbine engines which have significantly lower emissions of nitrogen oxides than those constructed and operated in a conventional manner.

The oxides of nitrogen ($NO_x$) are harmful atmospheric pollutants, and limitations on the amounts of those substances than can be legally discharged into the atmosphere have and are being curtailed on national, state, and local levels. While this legislation was initially directed toward atmospheric pollution by emissions from automobile engines, it has since and is now being extended to other areas. One of these involves stationary internal combustion engines, a category which includes gas turbine engines of the industrial type.

One primary object of the present invention is to provide novel, improved gas turbine engines which are capable of meeting the limitations on $NO_x$ emissions imposed by existing and proposed legislation. A related primary object is to provide methods of operating gas turbine engines that will enable them to meet these standards.

In internal combustion engines, nitrogen oxides are formed by the reaction between nitrogen and oxygen in the combustion air (thermal $NO_x$) and by the oxidation of fuel-bound nitrogen (fuel $NO_x$). My invention is principally concerned with inhibiting the formation of thermal $NO_x$ which is typically the dominant specie.

The formation of thermal $NO_x$ involves chemical reactions that are highly temperature dependent, doubling in rate for every 20° C. increase in flame temperature at temperatures above 1800° C. Consequently, the rate of thermal $NO_x$ formation can be greatly reduced by even small decreases in flame or combustion temperature.

This is the approach I employ to reduce the $NO_x$ emissions of gas turbine engines. I do this by introducing a liquid coolant into the primary combustion zone of the turbine engine combustor. This reduces the flame temperature by evaporation of the coolant and because the coolant raises the average specific heat of the combustion mixture.

Water is one suitable coolant although others are available as is noted in U.S. Pat. No. 3,826,080 issued July 30, 1974, to DeCorso et al. Deionized water or other water of high quality is preferably employed because minerals dissolved or entrained in the water could damage the combustor liner or turbine components of the engine. For water, coolant to fuel mass flow ratios of 0.6 to 1.9 are employed.

The injection of water into a combustion zone is not by itself claimed to be novel; that has theretofore been done by a variety of techniques for several different purposes as evidenced by the DeCorso patent identified above and by U.S. Pat. Nos. 2,402,826 issued June 25, 1946, to Lubbock; 2,509,648 issued May 30, 1950, to Mock; 2,642,852 issued June 23, 1953, to Bester; 3,224,195 issued Dec. 21, 1965, to Walsh; 3,749,318 issued Jul. 31, 1973, to Cottell; 3,809,523 issued May 7, 1974, to Varekamp; 3,814,567 issued June 4, 1974, to Zink et al; 3,921,389 issued Nov. 25, 1975, to Kawaguchi; 3,991,559 issued Nov. 16, 1976, to Oda et al; 4,084,934 issued Apr. 18, 1978, to Kamazawa; 4,089,639 issued May 18, 1978, to Reed et al; 4,110,973 issued Sept. 5, 1978, to Haeflich; 4,114,566 issued Sept. 19, 1978, to Harpman et al; 4,160,362 issued July 10, 1979, to Martens et al; 4,191,134 issued Mar. 4, 1980, to Goodman; and 4,214,435 issued July 29, 1980, to Campbell.

However, my approach is unique in that I introduce the water or other coolant and the fuel into the combustors of the gas turbine engines with which I am concerned separately with the water being supplied in the form of a film surrounded by the liquid fuel. This promotes uniform mixing of the water and fuel and, as a result, a uniform distribution of the water in the combustor's primary combustion zone. This is important because it inhibits the formation of local hot spots which is undesirable because the rate of thermal $NO_x$ formation is so highly temperature dependent.

The benefits of the just discussed technique of fuel injection are particularly noticeable when low ratios of coolant to fuel are used.

Introduction of the coolant into the combustor of a gas turbine engine in the manner just described can be effected by supplying it through the fuel injection nozzle or nozzles typically employed in gas turbine engines. In this case compressor discharge air, first flowed past a swirler, is used to form the coolant into the wanted film. Swirled compressor discharge air is also used to mix the coolant and fuel as they are discharged from the fuel injection nozzles and to atomize the fuel and coolant mixture as it enters the primary combustion zone.

This novel method of supplying the coolant to the combustor has the advantages discussed above; it also makes unnecessary the high coolant injection pressures common in heretofore proposed coolant injection systems.

One preferred type of fuel injection nozzle, disclosed herein, has provision for introducing air into its primary combustion air passage from an accessory compressor during start-up to promote the atomization of the fuel. The $NO_x$ emission reducing coolant can be introduced through this same passage, thereby eliminating the complexity common to other coolant injection systems.

The preferred form of fuel injection nozzle just discussed also has dual fuel capability. This permits the gas turbine engine to be operated on either a liquid fuel or on a gas fuel or on both types of fuel at the same time.

Also, in the foregoing fuel injection nozzles and in others I contemplate using, the passages through which the coolant flows can also be used to supply a second fuel to the combustor, especially because of the presence of the swirling compressor discharge air.

Yet another advantage of introducing coolant into the gas turbine engine combustor in the manner discussed above is that the decrease in combustor efficiency attributable to the injection of the coolant is minimal. For example, in one series of tests involving a 10,000 shaft horespower industrial gas turbine engine operated at full ¾, ½, ¼, and zero loads on DF-2 diesel fuel with water/fuel mass flows ratios ranging from 0 to 1.8, the decrease in combustor efficiency attributable to the injection of water never exceeded one percent except at the relatively unimportant no-load condition (this also means that carbon monoxide and unburned hydrocarbon emissions were low as they are proportional to combustion efficiency). At the same time, reductions in $NO_x$ emissions of up to 85 percent were obtained.

The gas turbine referred to above has 21 fuel injection nozzles spaced evenly in a vertically oriented, annular or circular array. The height difference between the air assist and coolant lines or pigtails leading to the upper and lower fuel injection nozzles produces a considerable difference between the pressure on the coolant flowing to the upper and lower nozzles. As a consequence, at low coolant flow rates, there can be a highly uneven distribution of coolant to the injection nozzles with more coolant flowing to the lower nozzles than to the upper ones. This leads to an uneven distribution of coolant in the combustor's primary combustion zone which is disadvantageous for the reasons discussed above.

I have found, however, that this problem can be solved by installing orifices and/or the use of a manifold system of the type shown in FIG. 2 in the pig tails. These reduce the difference in coolant flow to the upper and lower injection nozzles by increasing the coolant inlet pressure because mass flow is proportional to $\Delta P/P$. Thus, as P increases, $$\frac{\Delta P \text{ upper}}{P_s} \approx \frac{\Delta P \text{ lower}}{P_s}.$$

Still other advantages of my invention are attributable to the novel manifold system used to supply liquid fuel to the fuel injection nozzles of the gas turbine engines in which $NO_x$ emissions are reduced in accord with the principles of the present invention. Primary among these is that introduction of the fuel in that manner enhances the efficiency of the coolant used to suppress thermal $NO_x$ formation.

Certain important and primary objects of my invention have been identified above.

Another important object of my invention resides in the provision of novel gas turbine engine constructions and operating techniques in which a liquid coolant is introduced into the engine's combustor to decrease the flame temperature and thereby inhibit the formation of thermal $NO_x$.

Still other important and related but more specific objects of my invention reside in the provision of gas turbine engine constructions and operating techniques of the character just described:

which are simple;

which do not have the need for high pressure on the coolant common to heretofore proposed systems using a coolant to suppress the formation of thermal $NO_x$;

which are applicable to gas turbine engines with a dual fuel operating capability;

in which the system employed to introduce coolant into the combustor of the gas turbine engine can also be used to supply air during start-up to promote the atomization of the liquid fuels and/or to supply an alternate fuel to the engine;

which have no more than a small adverse effect on combustion efficiency;

which produce dramatic decreases in thermal $NO_x$ emissions;

in which the coolant is introduced into the combustor of the gas turbine engine in a uniform pattern;

in which the coolant is formed into a thin film and mixed with the liquid fuel and in which the fuel and coolant mixture is then atomized as it enters the combustor's primary combustion zone to promote the wanted uniform distribution of the coolant in that zone;

in which compressor discharge air is employed to form the coolant into a film prior to mixing it with the fuel;

in which compressor discharge air is used to promote the mixing of the fuel and water;

in which the coolant is introduced into the combustor of the gas turbine engine through fuel injection nozzles used to supply a liquid fuel to the combustor; and which guarantee a generally uniform mass flow of coolant to each of the several fuel injection nozzles of engines employing multiple nozzle fuel systems.

Still other important objects and features and additional advantages of my invention will become apparent from the appended claims and as the ensuing detailed description and discussion proceeds in conjunction with the accompanying drawing in which:

FIGS. 1A and 1B, taken together, constitute a partly sectioned side view of one gas turbine engine which can be equipped with a fuel and water injection system embodying, and constructed in accord with, the principles of the present invention;

Figure 1A:
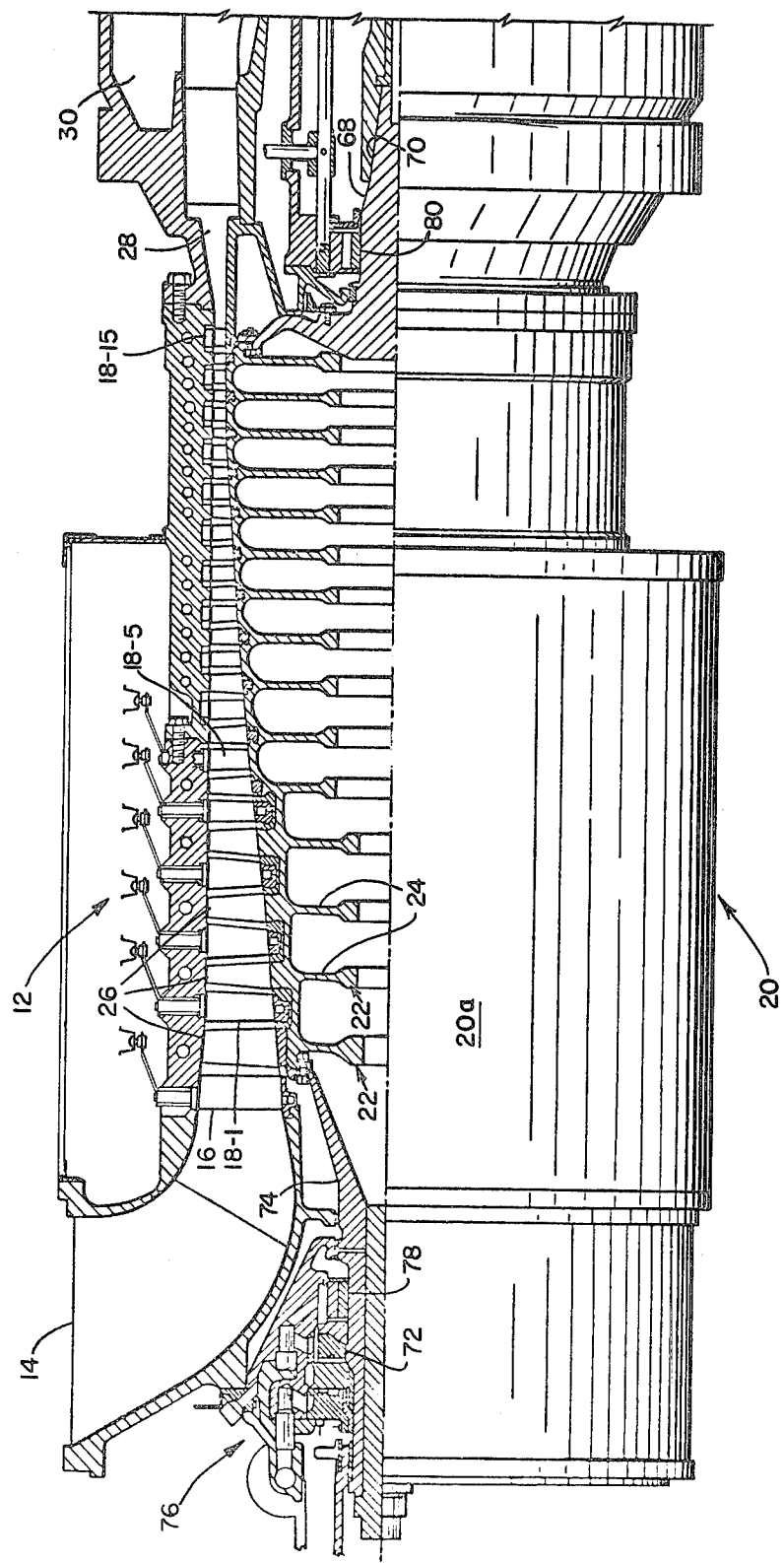
Figure 1B:
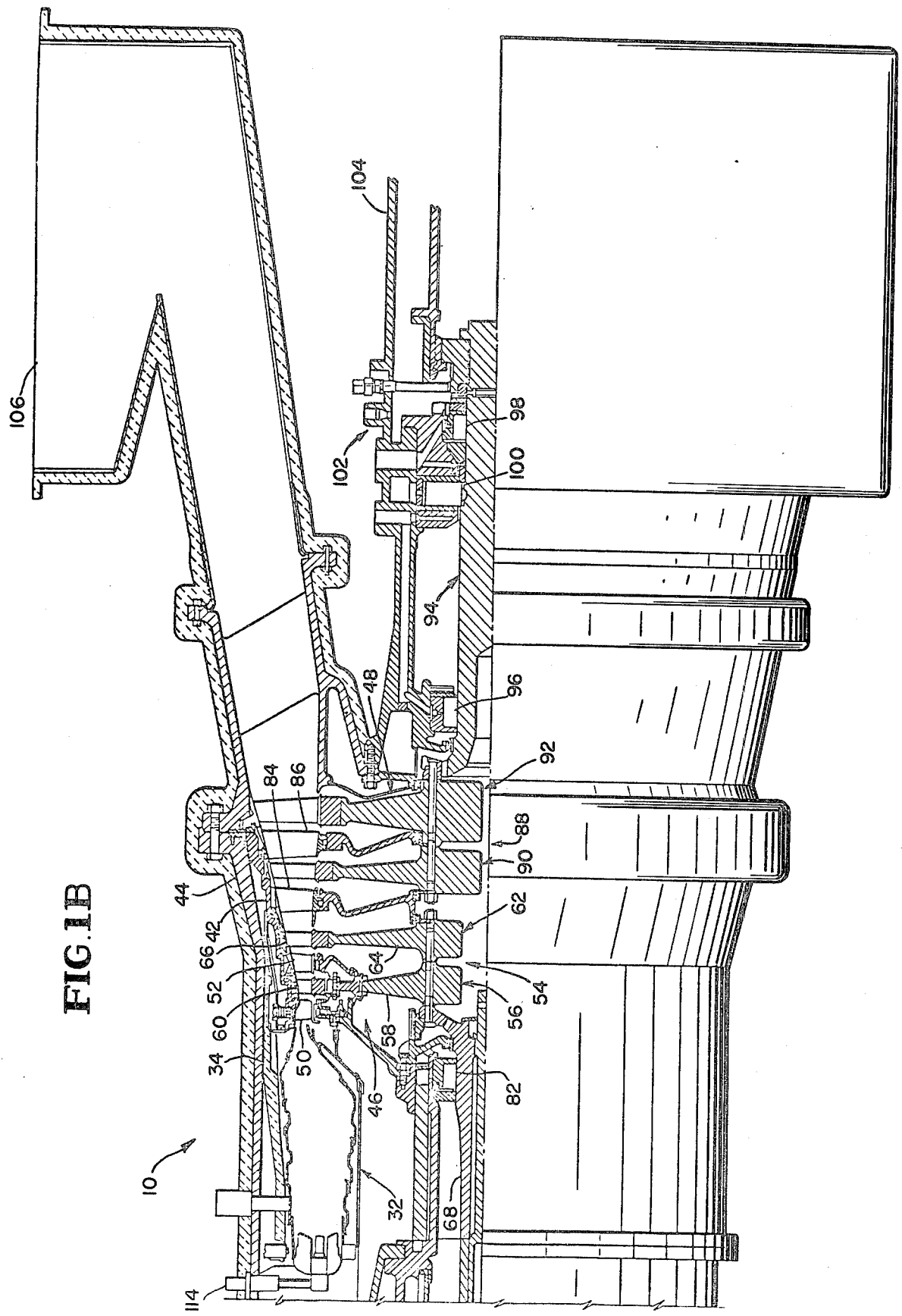

Referring now to the drawing, FIGS. 1A and 1B depict a two-shaft gas turbine engine 10 which can advantageously be equipped with a water injection system embodying the principles of the present invention to reduce the emission of nitrogen oxides from the engine.

Engine 10 includes a fifteen-stage axial flow compressor 12 with a radial-axial inlet 14. Inlet guide vanes 16 and stators 18 of the compressor are supported from compressor housing 20 with the guide vanes and the stators 18-1 through 18-5 of the first five stages being pivotally mounted so that they can be adjusted to control the flow of air through the compressor.

The fifteen-stage rotor 22 of compressor 12 is composed of discs 24 with vanes 26 fixed thereto. The discs are joined as by electron beam welding into a single unit.

Compressor housing 20 is split longitudinally on a vertical plane through the axial centerline of the housing into two sections 20a (only one of which is shown). This accommodates installation of the compressor rotor and facilitates access to the rotor blades, guide vanes, and stators for inspection, cleaning, and replacement.

The high pressure air discharged from compressor 12 flows through an annular, diverging diffuser 28 into an enlarged plenum 30 and from the latter to an annular combustor 32 housed in a case 34.

The hot gases generated in combustor 32 are discharged into a nozzle case 42 supported in an annular turbine housing 44. The hot gases are expanded first through a two-stage gas producer turbine 46 and then through a two-stage power turbine 48.

Gas producer turbine 46 has internally cooled, first and second stage nozzles 50 and 52 and a two-stage rotor 54.

The first stage 56 of gas producer turbine rotor 54 includes a disc 58 to which internally cooled, radially extending blades 60 are fixed. The second stage 62 includes a disc 64 with uncooled, radially extending blades 66 mounted on its periphery.

The two stages of gas producer turbine rotor 54 are bolted to each other and, in cantilever fashion, to the rear end of a forwardly extending shaft 68. Shaft 68 is keyed to rear compressor hub 70 which is bolted to compressor rotor 22, thereby drive-connecting gas producer turbine 46 to the compressor rotor.

The compressor rotor and gas producer turbine are rotatably supported by a thrust bearing 72 engaged with a front compressor hub 74 drive-connected to an accessory drive 76 and by tapered land bearings 78, 80, and 82.

Power turbine 48 includes first and second stage nozzles 84 and 86 also supported from nozzle case 42 and a rotor 88 having a first bladed state 90 and a second bladed stage 92 bolted together for concomitant rotation. Neither the nozzles nor the rotor are cooled.

Rotor 88 is bolted to a shaft assembly 94 rotatably supported by tapered land bearings 96 and 98 and by a thrust bearing 100. The shaft assembly is connected through a coupling 102 to an output shaft assembly 104 which is the input for a generator, booster compressor, mechanical drive, or other driven unit.

Another major component of turbine engine 10 is an exhaust duct 106 for the gases discharged from the power turbine.

For the most part, the details of the gas turbine engine components discussed above are not relevant to the practice of the present invention. Therefore, they will be described only as necessary to provide a setting for and facilitate an understanding of the latter.

Figure 2:
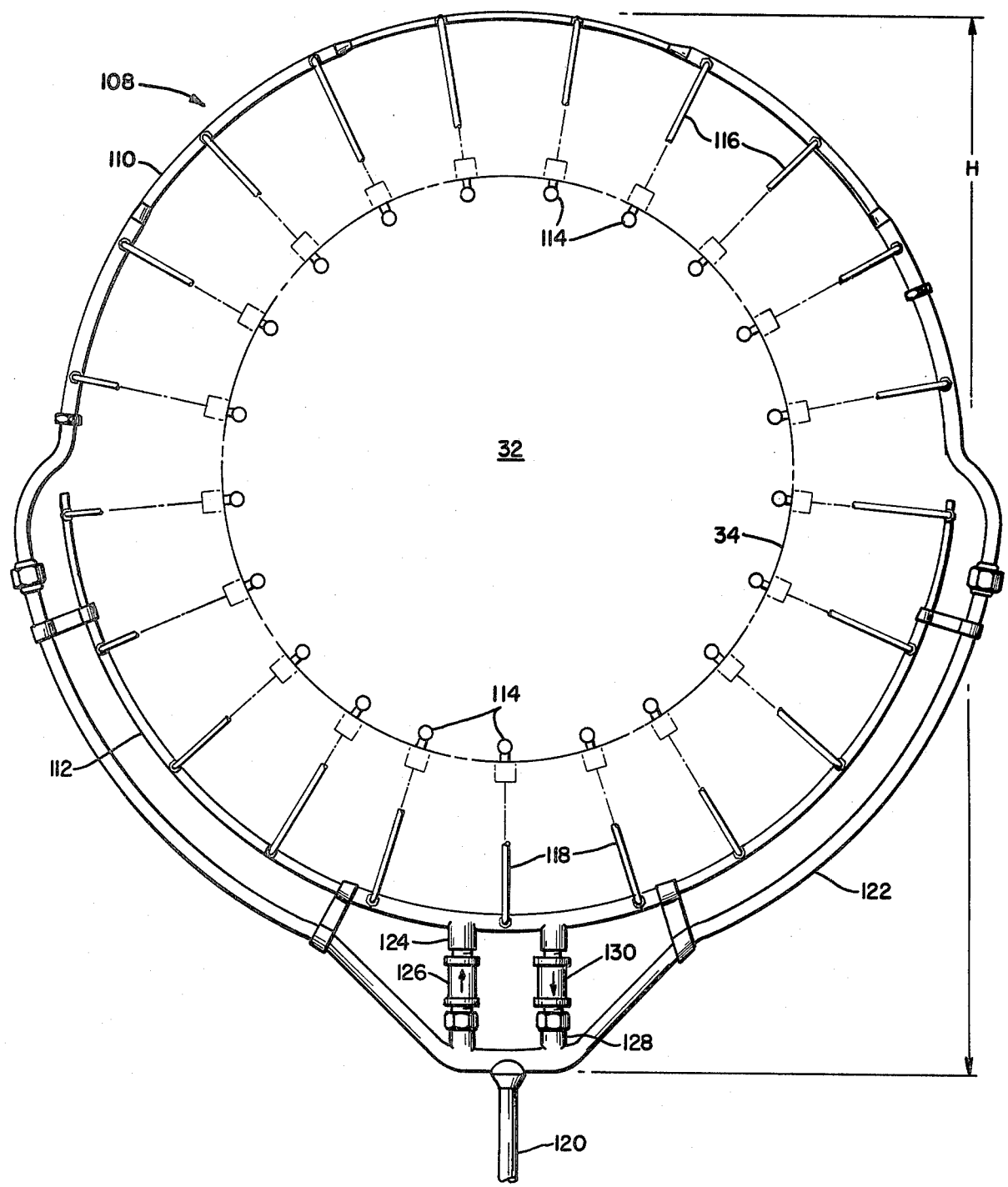
FIG. 2 shows, schematically, the combustor of the gas turbine engine and, in more detail, certain components of the fuel supply system employed in supplying liquid fuel to the combustor.
Figure 3:
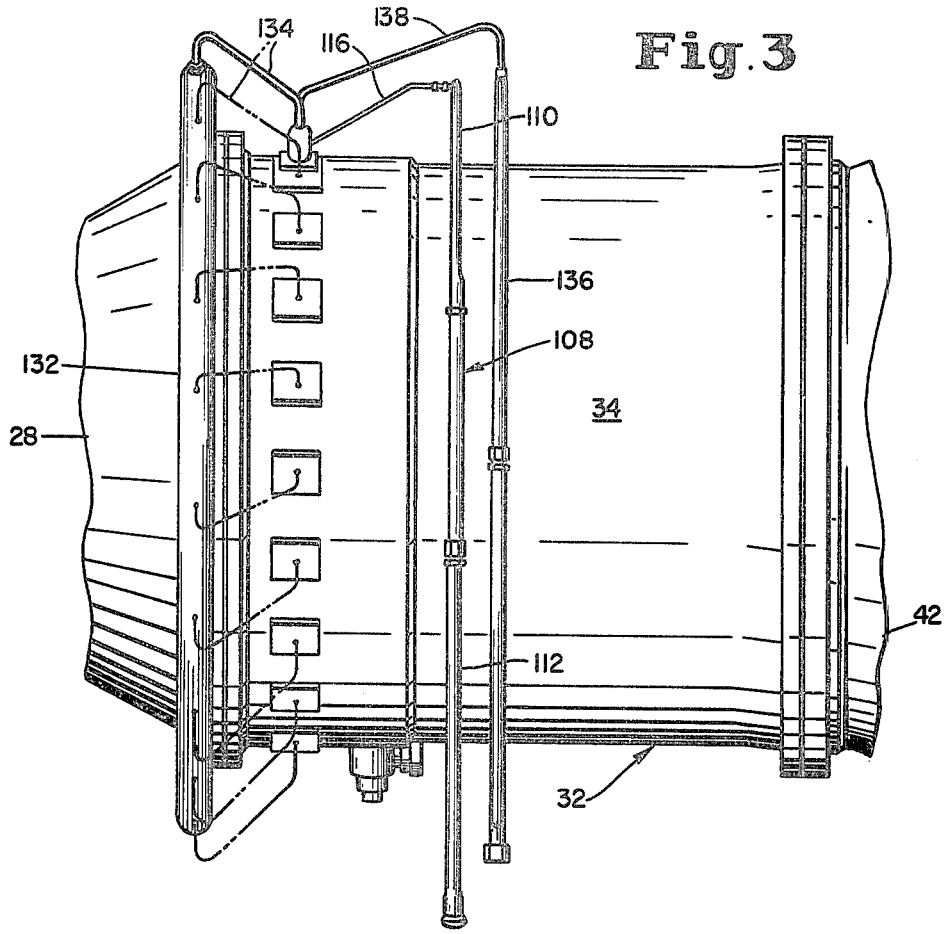
FIG. 3 is a fragmentary view of the gas turbine engine of FIG. 1 which includes the engine's combustor; manifolds for supplying gas and liquid fuels, atomization assist air, and $NO_x$ suppressing coolant to the compressor; and the lines or pig tails leading from the manifolds to the engine's fuel injection nozzles.

Referring now primarily to FIGS. 2 and 3, liquid fuel is supplied to the combustor 32 of gas turbine engine 10 by a liquid fuel supply system 108 which includes an upper manifold 110, a lower manifold 112, and injection nozzles 114 supplied with fuel from upper manifold 110 through fuel lines or pig tails 116 and from lower manifold 112 through fuel lines or pig tails 118. Fuel is supplied to the upper manifold 110 through fuel lines 120 and 122 and to the lower manifold 112 through a fuel line 124 extending between that manifold and fuel supply line 122. A check valve 126 is incorporated in fuel line 124 for purposes that will become apparent hereinafter.

Fuel supply system 108 also includes a fuel return line 128 connected between lower manifold 112 and fuel line 122. A second check valve 130 is incorporated in the fuel return line.

Particularly under the low fuel pressure conditions existing at light-off, the hydraulic head H across the fuel supply system would result in the fuel reaching those fuel injection nozzles 114 toward the bottom of combustor 32 much more rapidly than the uppermost injection nozzles if a simple ring type manifold were employed to supply fuel to the injection nozzles. This inequality of flow distribution is significantly reduced in the illustrated liquid fuel supply system 108 by the flow equalizing arrangement composed of fuel line 124 and check valve 126. Specifically, check valve 126 is set to open when the pressure in fuel line 122 reaches one-half of the hydraulic head H across the system. That reduces the fuel pressure at the bottom of lower manifold 112; and, consequently, the pressure vertically across that manifold (check valve outlet pressure — H/2) more nearly equals the pressure across the upper manifold 110 and its fuel supply line 122 (line pressure in 122 — H) than would otherwise be the case.

Also, by thus reducing the effect of the hydraulic head across fuel supply system 108, the arrangement just described results in a more uniform flow of fuel to the fuel injection nozzles at different elevations during the operation of the engine with which the fuel supply system is associated. This, too, results in more efficient combustion and lower emission levels.

The final feature of fuel supply system 108 alluded to above — fuel return line 128 — is provided so that fuel can drain from lower manifold 112 back into fuel lines 122 and 120 when engine 10 is shut down. The check valve 130 in line 128 is oriented for fuel flow in that direction.

As long as the engine is running and fuel is being supplied to it through fuel lines 120 and 122, the pressure in line 122 is higher than that in lower manifold 112 by virtue of the pressure drop across check valve 126; and valve 130 accordingly remains closed. When the engine is shut down, however, the pressure in lines 120 and 122 drops, and the hydraulic head on the fuel in the lower manifold consequently causes the check valve to open, thereby allowing the fuel to drain out of the manifold through return line 128.

Additional details of the foregoing liquid fuel supply system may be found in U.S. patent application Ser. No. 214,321 filed Dec. 8, 1980, by Robie L. Faulkner et al. That application is assigned to the assignee of this application and is hereby incorporated herein by reference.

Referring now to FIG. 3, gaseous fuels are supplied to fuel injection nozzles 114 via a circular manifold 132 which also surrounds and is supported from combustor case 34. Lines or pig tails 134 spaced equiangularly therearound connect the manifold to the several fuel injection nozzles 114.

Gas turbine engine 10 is also equipped with a circular or annular air assist manifold 136. Like the gas and liquid fuel manifolds, the air assist manifold surrounds and is supported from the combustor case. That manifold is connected to the several fuel injection nozzles 114 by an equiangularly spaced array of air supply lines or pig tails 138.

As shown in FIG. 2, combustor 32 has a circular section; and the fuel injection nozzles 114 are spaced around this casing in a circular array at essentially equal intervals with the discharge or downstream ends of the injectors located inside of, and discharging atomized fuel into, combustor 32.

Figure 4:
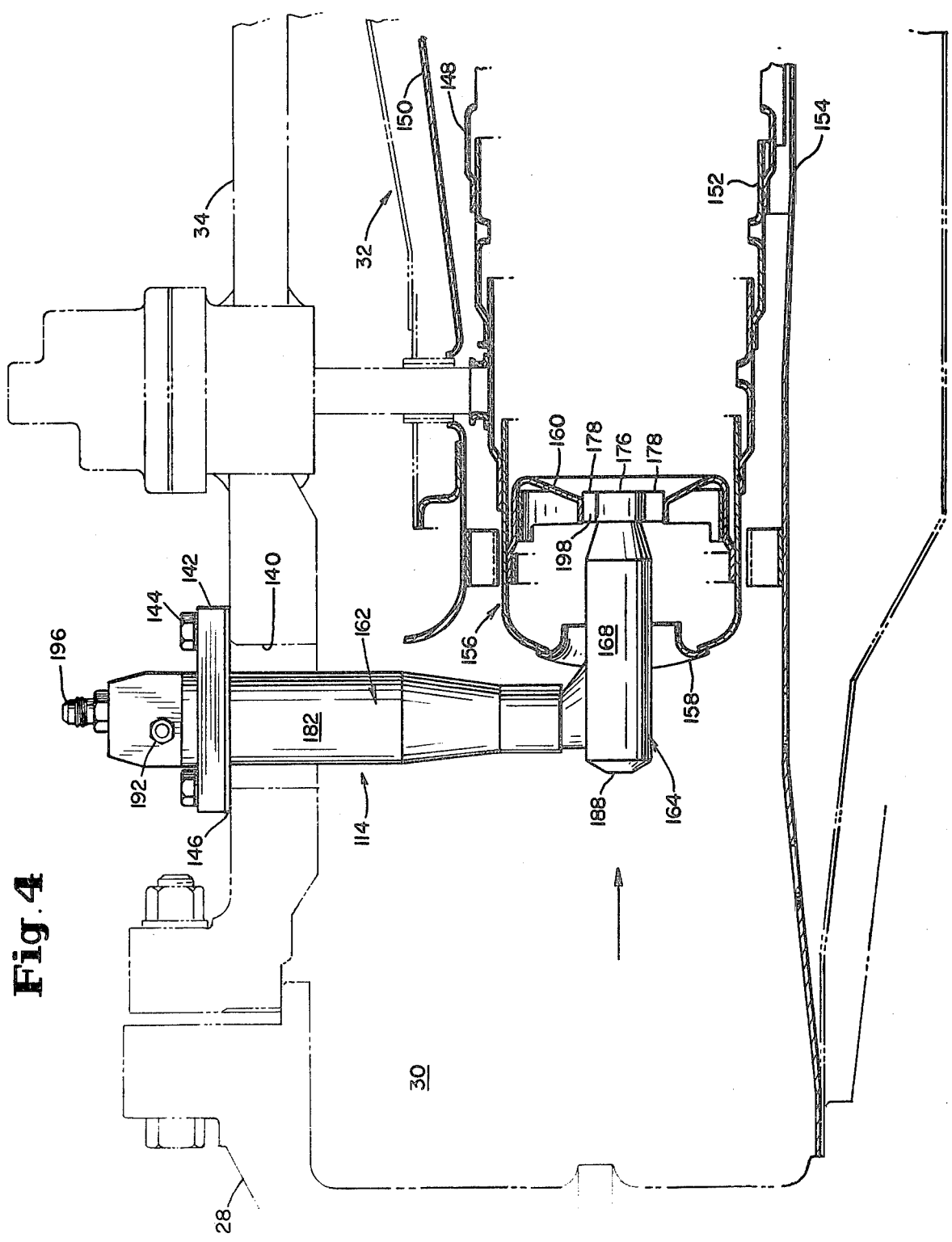
FIG. 4 is a fragment of FIG. 1B to a larger scale showing the upstream or dome end of the gas turbine engine combustor and one of several fuel injection nozzles.

Referring still to the drawing, FIG. 4 shows in more detail the manner in which fuel injectors 114 are supported from combustor case 34 and the manner in which combustor air is supplied to combustor 32.

The fuel injection nozzle 114 illustrated in FIG. 4 extends radially through an opening 140 in the combustor case with an integral mounting flange 142 seated on the outer surface of the latter. The injector is secured in place as by bolts 144 with a seal 146 being employed to keep compressor discharge air from escaping through the joint between the combustor case and the mounting flange.

The illustrated combustor 32 is of the annular type. The combustor has a circularly sectioned outer liner 148 surrounded by an outer shroud 150 and a concentrically disposed, circularly sectioned inner liner 152 which surrounds an inner shroud 154.

At the upstream end of combustor 32, the annular gap between outer combustor liner 148 and inner combustor liner 152 is spanned by an annular, generally U-sectioned, combustor dome 156. Also at this end of the combustor and at stations corresponding to the locations of fuel injection nozzles 114 are combustion air inlet guide members 158 and circular, sliding seal plates 160.

The details of the combustor as just described are not part of my present invention, and they will accordingly be alluded to hereinafter only as necessary to facilitate an understanding of that invention.

Fuel injection nozzles 114 are of the air blast type. Fuel supplied to the nozzles is atomized by air discharged from the compressor 12 of gas turbine engine 10 and mixed with an appropriate amount of air; and the fuel-air mixture is then discharged into combustor 32.

Figure 5:
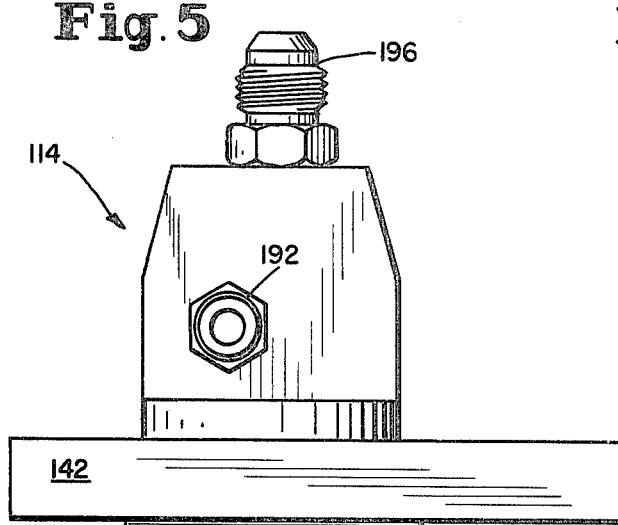
FIG. 5 is a side view of the fuel injection nozzle with certain of its components broken away to show the internal nozzle components.
Figure 7:
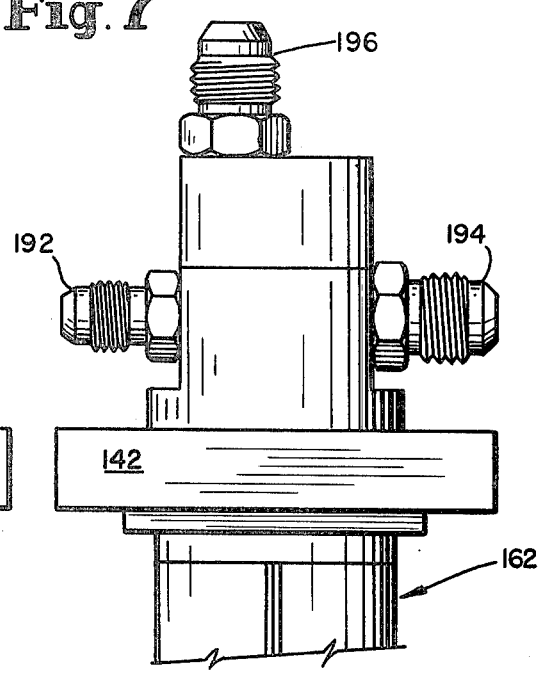
FIG. 7 is a view of the inlet end of the nozzle; it was taken at right angles to the view identified as FIG. 5.
Figure 6:
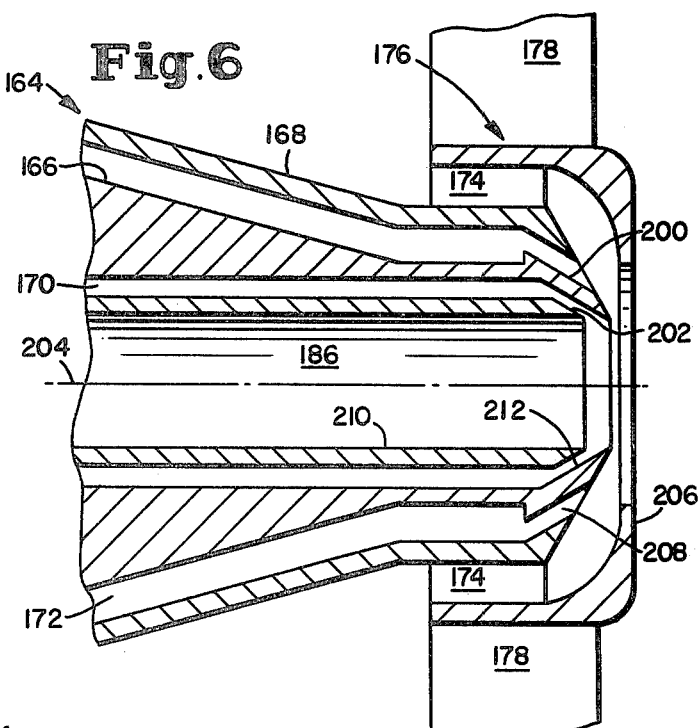
FIG. 6 is a partial longitudinal section through the fuel injection nozzle shown in FIGS. 4 and 5.

Referring again to the drawing, FIGS. 5–7 illustrate, in more detail, one of the fuel injection nozzles 114 referred to above. Fuel injection nozzles 114 are component parts of the liquid fuel supply system 108 employed to introduce liquid fuel into the combustor 32 of gas turbine engine 10. As suggested above, and as will be described in detail hereinafter, these same nozzles can also be utilized to instead, or simultaneously, introduce a gaseous fuel such as natural gas or sewer gas into the combustor.

The illustrated fuel injection nozzle 114 includes an elongated, circularly sectioned stem 162; a nozzle body 164; and shrouds 166 and 168. Shroud 166 cooperates with nozzle body 164 at the downstream or discharge end thereof to form an annular discharge passage 170 for liquid fuel. The second shroud 168 concentrically surrounds, and cooperates with, nozzle body 164 and shroud 166 to form an annular passage 172 for gaseous fuels.

At its forward or discharge end, shroud 168 supports an array of equiangularly spaced, radially extending, secondary air swirl vanes 174, only two of which are shown. Surrounding, and supported by, swirl vanes 174 is a cylindrical, secondary air shroud 176. This shroud supports an array of equiangularly spaced, radially extending swirl vanes 178, two of which are shown in FIG. 5.

The fuel injection nozzle stem 162 from which the just-described components are supported is made up of an inner component 180, a heat shield 182 surrounding the latter, and the mounting flange 142 referred to above. Longitudinally extending passages (not shown) for liquid fuels, gaseous fuels, and assist air employed to promote atomization at light-off are formed in fuel injection nozzle stem member 180. Fuel introduced into the passage for liquid fuels flows through it and then through fuel distribution orifices in the nozzle body (likewise not shown) into the liquid fuel discharge passage 170 between the nozzle body and shroud 166.

The passage in fuel injection nozzle stem 162 for gas fuels is inclined toward the discharge end of the injection nozzle at the inner end of the passage. There, it communicates with the annular gaseous fuel passage 166 formed between nozzle body 164 and shroud 168.

Assist air introduced into nozzle stem 162 flows from an inclined passage 184 in the stem into a primary air passage 186 which extends from end to end of nozzle body 164 and is concentric with the axial centerline of that component.

Primary air can also be introduced into passage 186 through the inlet 188 thereto at the upstream end of the nozzle body. A swirler 190 is mounted in the upstream end of nozzle body 164 to impart a rotational component to primary air introduced into central passage 186.

Referring now primarily to FIG. 7, liquid fuels, gaseous fuels, and assist air are introduced into the passages in fuel injection nozzles stem 162 through fittings 192, 194, and 196, respectively. The details of those fittings and the manner in which they communicate with the several flow passages in the fuel injection nozzle stem 162 are not part of my invention. These details will accordingly not be taken up herein.

As is best shown in FIG. 4, that inner, longitudinally extending part of fuel injection nozzle 114 made up of nozzle body 164 and shrouds 166 and 168 extends through combustion air inlet guide member 158 and through sliding seal plate 160, leaving an annular passage 198 between the seal plate and fuel injection nozzle secondary air shroud 176. Swirl vanes 178 span, and impart a rotational component to, combustion air discharged through this passage into combustor 32.

Referring now primarily to FIGS. 4–6, liquid fuel introduced into fuel injection nozzle 114 flows into the discharge passage 170 between nozzle body 164 and shroud 166 as discussed above. The discharge end 200 of the nozzle body is configured to match. Consequently, the liquid fuel is discharged from the fuel injection nozzle in the form of a thin film toward the axial centerline 204 of that longitudinally extending part of the fuel injection nozzle. This thin film of liquid fuel is contacted, and atomized, by the high velocity, swirling, primary combustion air discharged from the central air passage 186 through nozzle body 164, the air mixing with the fuel as atomization proceeds.

Secondary combustion air flows from air inlet guide member 158 through swirl vanes 174 which impart a rotational component to the secondary air. Shroud 176 has an inwardly inclined, annular lip 206. Consequently, the swirling secondary combustion air is directed inwardly and into contact with the mixing, atomizing fuel and primary combustion air. This promotes the atomization of the liquid fuel and the uniform distribution of the atomized fuel in the combustion mixture.

The resulting fuel-air mixture then expands radially and is contacted by the rotating air exiting from the passage 198 in which swirl vanes 178 are located. This produces the air-fuel (or stoichiometric) ratio needed for efficient combustion. It also generates the fuel-air mixture swirl angle and the distribution and recirculation of the mixture in combustor 32 required for efficient combustion.

As indicated above, the primary and secondary combustion air as well as that formed into a swirling annulus by vanes 178 is taken from the discharge side of compressor 12. More specifically, air discharged from the compressor flows through diverging diffuser 28 and is dumped into the forward part of plenum 30, decreasing the flow velocity of the air. From plenum 30 the air flows through air inlet guides 158 and, also, into heat transfer relationship with the outer and inner liners 148 and 152 of combustor 32 to cool those combustor components. The details of the compressor-combustor interface, which are not part of the present invention, may be found in U.S. Pat. No. 4,167,907 issued Sept. 11, 1979, to Wosika et al. That patent is assigned to the same assignee as this application, and it is hereby incorporated herein by reference.

As discussed above, the compressor discharge pressure may not be high enough at light-off to guarantee proper atomization of liquid fuel via the mechanisms just described; and, as was also discussed, assist air may be introduced into fuel injection nozzle 114 via fitting 196 for that purpose. One exemplary system for accomplishing this is disclosed in my copending application Ser. No. 285,993 which was filed July 23, 1981, and is hereby incorporated herein by reference.

Referring again to FIGS. 3-7, the operation of injectors 114 on a gaseous fuel is comparable to the above-described operation on liquid fuel. In the case of the gaseous fuel, however, the fuel is discharged from injection nozzle 114 through radially inwardly directed, equiangularly spaced ports 208 at the downstream end of nozzle 114 with a momentum which allows the gas to mix with the swirling primary and secondary combustion air streams without impinging on the lip of shroud 166. This is important as impingement on that lip or other components of the nozzle could create flow disturbances and consequent degradation in the efficiency of the combustion process.

The mixture formed by the contact between the fuel and the primary and secondary combustion air streams then, as in the case of the liquid fuel-air mixture, expands radially outward into contact with the swirling air discharged through swirl vanes 178. Thereafter, as in the case of the liquid fuel and as it reaches the combustion zone in combustor 32, a mixture with the correct ratio of fuel and with the swirl angle, distribution, and recirculation needed for efficient combustion is formed.

Referring now in particular to FIGS. 3-8, I pointed out above that water can be introduced into combustor 32 by way of the assist air passage 184 and primary air passage 186 in fuel injection nozzles 114 to reduce the nitrogen oxides emitted by engine 10. Compressor discharge air introduced into injection nozzle 114 and caused to rotate by swirler 190 forces the water leaving port or passage 184 into a film on the wall 210 of primary combustion air passage 186 due to centrifical force.

This film flows off the discharge end 202 of that part of nozzle component 164 in which the primary combustion air passage is formed and mixes with the sheet of fuel discharged from the slot 212 at the downstream or discharge end of liquid fuel supply passage 170.

The swirling primary combustion air, along with that discharged from swirl vanes 174, atomizes the water, as well as the liquid fuel, forming a homogeneous mixture of the two liquids.

As suggested above, one important advantage of this novel technique for introducing water into a combustion zone to suppress $NO_x$ formation is that an even and uniform distribution of the water is obtained. Furthermore, in contrast to heretofore proposed systems, high water injection pressures are not required as atomization and mixing are instead achieved by the swirling air discharged through swirlers 174 and 178. A related advantage, of considerable importance, is that efficient atomization and uniform mixing of the water, fuel, and combustion air is obtained even at low water to fuel flow ratios.

Figure 8:
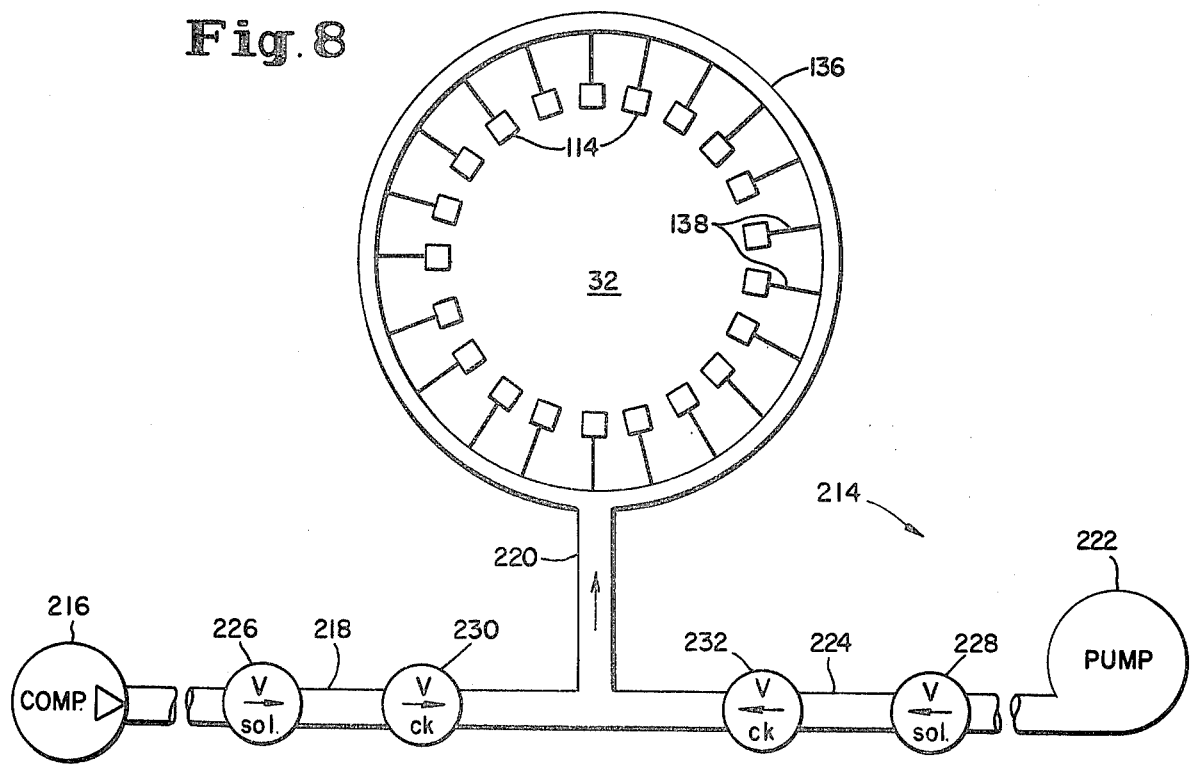
FIG. 8 is a schematic of systems used to supply coolant and start-up assist air to the fuel injection nozzles.

One exemplary system for supplying water and atomization assist air during light-off to fuel injection nozzles 114 is illustrated schematically in FIG. 8 and identified by reference character 214. In additional to the manifold 136 and pig tails 138 discussed above, system 214 includes a compressor 216 for supplying atomization assist air to fuel injection nozzles 114 during the light-off of gas turbine engine 10 via lines 218 and 220 and a pump 222 for supplying water to the fuel injection nozzles via lines 224 and 220 during operation of the gas turbine engine thereafter.

Conventional solenoid valves 226 and 228 are located in air and water supply lines 226 and 228, respectively. During light-off, valve 226 is opened and valve 228 closed, allowing atomization assist air to flow to injectors 114. After light-off, valve 226 is closed, valve 228 opened, and water pumped to the injectors for the purposes discussed above.

Check valves 230 and 232 are also incorporated in air assist and water supply lines 218 and 224, respectively. These keep water from flowing to compressor 216 when water injection is being employed and air from flowing to pump 222 when assist air is being supplied to the gas turbine engine.

The efficacy of my novel technique for reducing the nitrogen oxides generated in a combustion process was demonstrated by tests in which a gas turbine engine of the type discussed above and identified by reference character 10 in the drawings was run as discussed above at a constant power turbine inlet temperature and over the range of operating conditions varying from no-load to full load and at a still higher load level (1935° TRIT) that might be encountered under standby applications of the engine, for example. The water to fuel mass flow ratios employed at the various load conditions and the reductions in $NO_x$ emissions that were obtained are tabulated along with related, relevant data in the following tables:

TABLE 1

FULL LOAD
SN 5/4 MARS LIQUID FUEL
ENGINE EMISSIONS DIESEL 2 FUEL

| POWER TURB. INLET TEMP. °F. | MEAS. POWER BHP | $NO_x$ Gm/ Kg | $NO_x$ ppm | $NO_x$ lbm/hr | BURNER EFFIC'Y. | WATER* FUEL |
|---|---|---|---|---|---|---|
| 1256 | 8936 | 15.4 | 203 | 65.3 | 99.45 | 0 |
| 1258 | 9298 | 11.3 | 148 | 49.7 | 99.84 | .25 |
| 1262 | 9739 | 7.3 | 96 | 33.4 | 99.87 | .50 |
| 1255 | 9960 | 4.7 | 62 | 22.2 | 99.89 | .74 |
| 1254 | 10166 | 3.7 | 49 | 17.9 | 99.90 | 1.00 |
| 1258 | 10785 | 2.8 | 37 | 14.2 | 99.95 | 1.19 |
| 1241 | 10903 | 2.1 | 27 | 10.7 | 99.96 | 1.44 |
| 1253 | 10475 | 2.6 | 34 | 13.3 | 99.95 | 1.40 |
| 1256 | 10872 | 2.3 | 30 | 12.2 | 99.95 | 1.60 |

*Water to Fuel Mass Flow Ratio

TABLE 2

¾ LOAD CONDITION
SN 5/4 MARS LIQUID FUEL
ENGINE EMISSIONS DIESEL 2 FUEL

| POWER TURB. INLET TEMP. | MEAS. POWER BHP | $NO_x$ Gm/Kg | $NO_x$ ppm | $NO_x$ lbm/hr | BURNER EFFIC'Y. | WATER FUEL |
|---|---|---|---|---|---|---|
| 1141 | 7675.2 | 3.5 | 46.5 | 13.89 | 99.96 | 1.0 |
| 1146 | 7154.5 | 5.7 | 76. | 20.95 | 99.99 | .5 |
| 1140 | 6795.8 | 12.8 | 171. | 44.69 | 99.55 | 0 |
| 1140 | 7976.9 | 2.5 | 33. | 10.40 | 99.90 | 1.4 |

TABLE 3

½ LOAD CONDITION
SN 5/4 MARS LIQUID FUEL
ENGINE EMISSIONS DIESEL 2 FUEL

| POWER TURB. INLET TEMP. | MEAS. POWER BHP | $NO_x$ Gm/Kg | $NO_x$ ppm | $NO_x$ lbm/hr | BURNER EFFIC'Y. | WATER FUEL |
|---|---|---|---|---|---|---|
| 1028 | 5244.7 | 3.10 | 42 | 9.60 | 99.87 | 1.0 |
| 1031 | 5600.6 | 2.90 | 38 | 9.60 | 99.60 | 1.59 |
| 1019 | 4518.0 | 12.00 | 158 | 32.23 | 99.92 | 0. |
| 1021 | 5355. | 3.10 | 41 | 10.08 | 99.24 | 1.46 |
| 1021 | 5430. | 2.90 | 38 | 9.68 | 99.02 | 1.60 |

TABLE 4

¼ LOAD CONDITION
SN 5/4 MARS LIQUID FUEL
ENGINE EMISSIONS DIESEL 2 FUEL

| POWER TURB. INLET TEMP. | MEAS. POWER HBP | $NO_x$ Gm/Kg | $NO_x$ ppm | $NO_x$ lbm/hr | BURNER EFFIC'Y. | WATER FUEL |
|---|---|---|---|---|---|---|
| 873 | 2573 | 3.4 | 46 | 7.04 | 99.11 | 1.0 |
| 863 | 2201 | 5.4 | 72 | 9.68 | 99.80 | .33 |
| 865 | 2212 | 4.9 | 64 | 8.73 | 99.71 | .49 |
| 862 | 2244 | 3.8 | 50 | 7.00 | 99.52 | .75 |
| 863 | 1976.4 | 7.3 | 96 | 12.15 | 99.81 | 0. |

TABLE 5

NO LOAD CONDITION
SN 5/4 MARS LIQUID FUEL
ENGINE EMISSIONS DIESEL 2 FUEL

| POWER TURB. INLET TEMP. | MEAS. POWER HBP | $NO_x$ Gm/Kg | $NO_x$ ppm | $NO_x$ lbm/hr | BURNER EFFIC'Y. | WATER FUEL |
|---|---|---|---|---|---|---|
| 799 | −14.9 | 4.23 | 56 | 3.73 | 98.44 | 0. |

TABLE 6

1935° F. TRIT CONDITION
SN 5/4 MARS LIQUID FUEL ENGINE EMISSIONS
DIESEL 2 FUEL

| POWER TURB. INLET TEMP. | MEAS. POWER BHP | $NO_x$ Gm/Kg | $NO_x$ ppm | $NO_x$ lbm/hr | BURNER EFFIC'Y. | WATER FUEL |
|---|---|---|---|---|---|---|
| 1356 | 10850 | 20.5 | 269 | 101.20 | 99.90 | 0. |
| 1300 | 11536 | 4.3 | 56 | 23.26 | 99.92 | 1.28 |
| 1287 | 11708 | 3.6 | 47 | 19.92 | 99.91 | 1.58 |
| 1280 | 11870 | 3.4 | 45 | 19.13 | 99.98 | 1.88 |

As will be apparent from the foregoing tables, reduction in $NO_x$ emissions of up to 82 percent were obtained in the tests. On the other hand, the decrease in combustor efficiency was never more than about one percent under any of the test conditions except at no-load. The test at that condition, which is obviously not as significant as those at load conditions from a practical viewpoint, was aborted because a somewhat larger decrease in combustor efficiency (1.56 percent) was experienced.

It was pointed out above that orifices are preferably installed in the air assist/coolant pig tails so that the coolant will be uniformly distributed among the several fuel injection nozzles 114. In the test described above, 0.052 inch diameter orifices were employed. Orifices with larger openings, for example 0.056 inch, are also contemplated.

By increasing the size of the opening, the pressure on the atomization assist air required for good atomization of the fuel during light-off can be significantly reduced. On the other hand, larger orifices may allow a wider variance in the mass flow rate of the coolant to the different injectors to develop, especially at the lower coolant flow rates. This might prove undesirable because a variance in flow rates could result in higher $NO_x$ emissions.

The principles of my invention were developed above specifically with reference to their application to gas turbine engines and, more specifically, to engines of that character equipped with a dual fuel supply system. It is to be understood, however, that the invention is of much broader utility. Specifically, my invention is readily adaptable to a wide range of air blast fuel injection nozzles and, generally, to the reduction of $NO_x$ emissions in other settings, not just those involving gas turbine engines. Consequently, to the extent that specific applications of my invention are not expressly ruled out by the appended claims, they are fully intended to be covered in them.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by U.S. Letters Patent is:

1. Combustion apparatus comprising the combination of: a combustor in which liquid fuel can be burned and means for reducing the emission of nitrogen oxides from said combustor, said last-mentioned means comprising means for; introducing a liquid coolant and the liquid fuel into said combustor; there mixing said coolant with said fuel; atomizing the fuel and coolant and forming a uniform mixture of fuel, coolant, and combustion air as the mixture enters the primary combustion zone in said combustor, said means for introducing a liquid coolant and the liquid fuel into said combustor comprising at least one fuel injection nozzle for introducing the liquid fuel into the combustor and means for introducing said liquid coolant into said combustor through said fuel injection nozzle, said fuel injection nozzle comprising a body having a centrally disposed combustion air passage extending through and opening onto one end thereof and an annular liquid fuel passage concentrically surrounding said air passage and opening onto the same end of the nozzle as said combustion air passage; said combustor further comprising means for introducing the liquid fuel into said annular passage; means for introducing the liquid coolant into the combustion air passage, and means for forming said liquid coolant into a film on the wall of said combustion air passage comprising means for introducing air into said centrally disposed passage and means for imparting a swirl to the air in said centrally disposed passage, thereby promoting the uniform mixing of said coolant and said fuel as they are discharged from said one end of said fuel injection nozzle.

2. A gas turbine engine comprising: a compressor; turbine means for driving said compressor and for providing kinetic energy in useful form; a combustor in which the liquid fuel can be burned with air discharged from said compressor to provide hot gases for driving said turbine means; and means for reducing the emission of nitrogen oxides from said engine, said last-mentioned means comprising: means for introducing a liquid coolant and the liquid fuel into said combustor; there mixing said coolant with said fuel; atomizing the fuel; and forming a uniform mixture of air, liquid coolant, and fuel as said mixture enters the primary combustion zone in said combustor, said means for introducing a liquid coolant and the liquid fuel into said combustor comprising at least one fuel injection nozzle for introducing the liquid fuel into the gas turbine engine combustor and means for introducing the liquid coolant into said combustor through said fuel injection nozzle, said fuel injection nozzle comprising a body having a centrally disposed, combustion air passage extending through and opening onto one end thereof and an annular liquid fuel passage concentrically surrounding said combustion air passage and opening onto the same end of said body as the latter; said gas turbine engine further comprising means for introducing the liquid fuel into said annular passage; means for introducing the liquid coolant into the combustion air passage; and means for forming said liquid coolant into a film on the wall of said combustion air passage comprising means for introducing air into said centrally disposed passage and means for imparting a swirl to the air in said centrally disposed passage, thereby promoting the uniform mixing of said coolant and said fuel as they are discharged from said one end of said fuel injection nozzle.

3. A gas turbine engine comprising: a compressor; turbine means for driving said compressor and for providing kinetic energy in useful form; a combustor in which the liquid fuel can be burned with air discharged from said compressor to provide hot gases for driving said turbine means; and means for reducing the emission of nitrogen oxides from said engine, said last-mentioned means for comprising means for: introducing a liquid coolant and the liquid fuel into said combustor; there mixing said coolant with said fuel; atomizing the fuel; and forming a uniform mixture of air, liquid coolant, and fuel as said mixture enters the primary combustion zone in said combustor, including means comprising a plurality of fuel injection nozzles for introducing the liquid fuel into the gas turbine engine combustor and means for introducing the liquid coolant into said combustor through said fuel injection nozzles, said fuel injection nozzles being equidistantly spaced in a circular array and the means for supplying the liquid fuel to the nozzles comprising upper and lower, arcuately shaped fuel manifolds having, together, an essentially circular configuration, the circular array of equiangularly spaced fuel injection nozzles being spaced concentrically within the circle formed by said manifolds; fuel lines connecting those fuel injectors girdled by each of the manifolds to that manifold at generally equidistantly spaced locations therealong; means for supplying fuel to the upper manifold at the opposite ends thereof; a fuel supply line connected between said fuel supplying means and said lower manifold approximately mid way between the ends of the latter; and means in said fuel supply line for creating a pressure drop that is effective to cause said fuel to be distributed at rates approaching equal through the upper and lower fuel manifolds.

4. A gas turbine engine as defined in claim 1 wherein said fuel injection nozzle also comprises a gas fuel shroud forming an annular supply passage for a gaseous fuel around said liquid fuel passage and an annular array of communicating discharge ports at said one end of said nozzle, said discharge ports being inclined toward the axial centerline of said cylindrical nozzle body.

5. A gas turbine engine as defined in claim 4 wherein said fuel injection nozzle has an air shroud forming a secondary air passage, said passage being, at its discharge side, inclined toward the axial centerline of said nozzle at, and beyond, said one end thereof.

6. A gas turbine engine as defined in claim 5 wherein said fuel injection nozzle has means surrouding said secondary air passage forming means for imparting a swirl to air supplied to and flowing therethrough to stabilize the flame generated by the combustion of fuel discharged from said nozzle.

7. A gas turbine engine as defined in claim 2 wherein said fuel injection nozzle also comprises a shroud surrounding the nozzle body and forming therewith an annular supply passage for a gaseous fuel which concentrically surrounds said liquid fuel passage and an annular array of discharge ports at said one end of said nozzle body, said discharge ports communicating with said gaseous fuel passage and being inclined toward the axial centerline of said nozzle body.

8. A gas turbine engine as defined in claim 7 wherein said fuel injection nozzle has an air shroud forming a secondary air passage around the nozzle body, said passage being, at its discharge side, inclined toward the axial centerline of said nozzle body at, and beyond, said one end thereof.

9. A gas turbine engine as defined in claim 8 wherein said fuel injection nozzle has means surrounding said secondary air passage forming means for imparting a swirl to air supplied to and flowing therethrough to stabilize the flame generated by the combustion of fuel discharged from said nozzle.

10. A gas turbine engine as defined in any of the preceding claims 8 or 9 wherein the air introducing means includes the gas turbine engine compressor, whereby said air is compressor discharge air.

11. A gas turbine engine as defined in claim 2 which has a plurality of fuel injection nozzles as aforesaid and which includes means for supplying gaseous fuel to the fuel injection nozzles, said last-mentioned means comprising a circular manifold surrounding the turbine engine combustor and fuel lines connecting said manifold to said fuel injection nozzles.

12. A gas turbine engine as defined in claim 2 which has a vertically oriented, annular array of fuel injection nozzles as aforesaid and wherein the means for introducing coolant into the gas turbine engine combustor includes an annular coolant supply manifold and lines connecting said manifold to said nozzles, there being orifices in said lines for equalizing the flow of coolant to the several nozzles.

13. A gas turbine engine as defined in claim 3 wherein the means in the liquid fuel supply system for creating said pressure drop is a check valve oriented to allow fuel to flow from said fuel supplying means through said fuel supply line to said lower manifold.

14. A gas turbine engine as defined in either of the preceding claims 3 or 13 in which the liquid fuel supply system includes means for draining fuel from said lower manifold coincidentally with the shutdown of the engine, said means comprising a fuel return line connected between said fuel supplying means and said lower manifold adjacent said fuel supply line and a check valve in said fuel return line which is oriented to allow fuel to flow from said lower manifold into said fuel supplying means when the pressure in the latter falls below the pressure in the lower manifold.

15. A gas turbine engine as defined in either of the preceding claims 3 or 13 in which the supplying means of the liquid fuel supply system comprises a first, generally semicircular fuel line surrounding the lower manifold and connected at its opposite ends to the ends of the upper manifold, and a second fuel line communicating with the first fuel line approximately mid way between the ends of the latter.

* * * * *

UNITED STATES PATENT AND TRADEMARK OFFICE
CERTIFICATE OF CORRECTION

PATENT NO. : 4,483,137
DATED : November 20, 1984
INVENTOR(S) : Robie L. Faulkner It is certified that error appears in the above-identified patent and that said Letters Patent is hereby corrected as shown below:

Column 1, line 67, change "Kamazawa" to --Kumazawa--.

Column 2, line 1, after "Haeflich" insert --et al--.

Column 6, line 40, after "et al" insert --(now U.S. Patent No. 4,402,184 dated September 6, 1983)--.

Column 8, line 5, change "166" to --172--.

Column 8, line 37, delete --the nozzle body--.

Column 8, line 37, after "of" insert --shroud 166--.

Column 8, line 37, after "match" insert --the discharge end 202 of nozzle body 164 at the outlet of passage 170--.

Column 12, line 68, change the "," to --;--.

Column 13, line 49, delete --for-- (first occurrence).

Signed and Sealed this

Twelfth Day of November 1985

[SEAL]

Attest:

DONALD J. QUIGG

Attesting Officer

Commissioner of Patents and Trademarks